United States Patent [19]

Oklejas

[11] Patent Number: 6,036,435
[45] Date of Patent: Mar. 14, 2000

[54] THRUST BEARING

[75] Inventor: Robert A. Oklejas, Monroe, Mich.

[73] Assignee: Pump Engineering, Inc., Monroe, Mich.

[21] Appl. No.: 09/048,640

[22] Filed: Mar. 26, 1998

Related U.S. Application Data

[60] Provisional application No. 60/040,923, Mar. 27, 1997.

[51] Int. Cl.[7] .................................................. F01D 3/00
[52] U.S. Cl. ........................ 415/111; 415/112; 415/113; 415/106; 415/107
[58] Field of Search ................................. 415/104, 106, 415/111, 112, 113, 107; 384/112, 121, 123; 417/365

[56] References Cited

U.S. PATENT DOCUMENTS

| | | | |
|---|---|---|---|
| 3,563,618 | 2/1971 | Ivanov . | |
| 3,588,203 | 6/1971 | Purman | 308/160 |
| 4,007,974 | 2/1977 | Huber | 308/9 |
| 4,026,399 | 5/1977 | Ladin | 192/98 |
| 4,255,081 | 3/1981 | Oklejas et al. . | |
| 4,288,128 | 9/1981 | Wells | 308/36.2 |
| 4,333,692 | 6/1982 | Kraus | 308/9 |
| 4,337,018 | 6/1982 | Singer et al. | 418/132 |
| 4,348,065 | 9/1982 | Yoshioka et al. | 308/9 |
| 4,355,850 | 10/1982 | Okano | 308/9 |
| 4,383,771 | 5/1983 | Freytag et al. | 384/121 |
| 4,462,700 | 7/1984 | Agrawal | 384/105 |
| 4,494,882 | 1/1985 | Pollok | 384/307 |
| 4,555,007 | 11/1985 | Harrington et al. | 192/98 |
| 4,639,148 | 1/1987 | Tamura et al. | 384/420 |
| 4,726,695 | 2/1988 | Showalter | 384/121 |
| 4,734,020 | 3/1988 | Inaba et al. | 418/55 |
| 4,828,403 | 5/1989 | Schwartzman . | |
| 4,830,572 | 5/1989 | Oklejas et al. . | |
| 4,915,510 | 4/1990 | Arvidsson | 384/99 |
| 4,966,708 | 10/1990 | Oklejas et al. | 210/637 |
| 4,983,305 | 1/1991 | Oklejas et al. . | |
| 5,049,045 | 9/1991 | Oklejas et al. | 417/365 |
| 5,076,716 | 12/1991 | Mizobuchi et al. | 384/369 |
| 5,082,428 | 1/1992 | Oklejas et al. | 417/362 |
| 5,106,262 | 4/1992 | Oklejas et al. . | |

(List continued on next page.)

OTHER PUBLICATIONS

European Search Report on Int'l. Appl. No. PCT/US98/06130 corresponding to this U.S. patent application.

*Primary Examiner*—Edward K. Look
*Assistant Examiner*—Ninh Nguyen
*Attorney, Agent, or Firm*—Emch, Schaffer, Schaub & Porcello, Co. L.P.A.

[57] ABSTRACT

A thrust bearing for a rotating member that is subject to axial forces causing movement in an axial direction of a rotating member. A sealing surface is positioned on at least a portion of the rotating member. A bearing is positioned adjacent the rotating member. A sealing face is positioned on the bearing. The sealing face is disposed to be in opposed relationship with the sealing surface on the rotating member. A bearing space is located between the sealing face and the sealing surface. A fluid reservoir is positioned in the bearing and is in communication with the bearing space. A passageway extends through the bearing to a volute adjacent the rotating member to supply a fluid to the fluid reservoir. A plurality of pockets are positioned on the sealing face of the bearing. The pockets are positioned to be in communication with the fluid reservoir. A plurality of wedge shaped depressions are positioned on the sealing face of the bearing. The depressions are disposed to be positioned adjacent and in communication with the pockets and the fluid reservoir. Fluid from the reservoir enters the pockets. As the rotating member rotates, the fluid in the pockets is dragged by the rotating member in the wedge shaped depressions. The pressure on the fluid increases as the fluid is forced, due to the rotation of the rotating member, into a decreasing clearance formed by the wedge shaped depressions. The increased fluid pressure in the depressions also acts on the sealing face of the bearing to counteract axial forces placed on the rotating member.

12 Claims, 6 Drawing Sheets

U.S. PATENT DOCUMENTS

| | | | |
|---|---|---|---|
| 5,188,462 | 2/1993 | Hooper et al. | 384/93 |
| 5,273,413 | 12/1993 | Wallin | 418/201.1 |
| 5,286,114 | 2/1994 | Raphael | 384/121 |
| 5,312,190 | 5/1994 | Vohr | 384/206 |
| 5,366,298 | 11/1994 | Toshimitsu et al. | 384/107 |
| 5,413,469 | 5/1995 | Nakajima et al. | 418/55.1 |
| 5,425,345 | 6/1995 | Lawrence et al. | 123/559.1 |
| 5,433,529 | 7/1995 | Hensel | 384/112 |
| 5,487,608 | 1/1996 | Leuthold et al. | 384/113 |
| 5,529,398 | 6/1996 | Bosley | 384/105 |
| 5,533,812 | 7/1996 | Leuthold et al. | 384/112 |
| 5,533,814 | 7/1996 | Slocum | 384/123 |
| 5,540,504 | 7/1996 | Cordova et al. | 384/100 |
| 5,540,505 | 7/1996 | Struziak | 384/105 |
| 5,547,286 | 8/1996 | Struziak | 384/105 |
| 5,951,169 | 9/1999 | Oklejas . | |

THRUST BEARING

This application is a continuation of the provisional application Serial No. 60/040,923 filed Mar. 27, 1997.

BACKGROUND OF THE INVENTION

The invention is directed to thrust bearing for pumps and turbines. More particularly, the thrust bearing of the present invention is designed to accommodate axial thrust loads. In pumps and turbines, there is usually an imbalance in the pressure exerted by the pumped fluid on the rotating impeller. At the inlet for fluid, the pressure is low and usually the pressure from the pumped fluid on the opposite side of the impeller is high. This creates a pressure imbalance on the impeller that can affect the operation of the pump or turbine.

Axial thrust loads on the rotors of pumps and turbines is a universal occurrence. Sometimes axial thrust is balanced symmetrically or nearly so, on either side of the rotors, as in the case of double suction pumps, so that thrust absorption of the rotor is not a significant problem. However, in the majority of designs significant net axial thrust is imposed on the impeller to the extent that provisions are made to incorporate thrust bearings into the pump or turbine.

In the majority of designs of industrial centrifugal turbo machines the thrust bearing is located in a housing separate from the pressure casing. These bearings are usually of either the rolling contact type (anti friction ball and roller bearing) or of the sliding contact type (hydrostatic or hydrodynamic) and are lubricated by grease or oil.

A centrifugal pump or turbine design can be greatly simplified by positioning the thrust bearing in the pressure casing as described in U.S. Pat. No. 5,082,428. Such an arrangement not only absorbs axial thrust loads but just as significantly provides an exceptionally efficient face seal between the high pressure region of the pump (discharge) and the low pressure region (section). Volumetric efficiencies of 98 to 99 percent have been achieved in practice. This compares to typical wearing ring equipped pumps having volumetric efficiencies (as new) of 0.85% to 0.9%. However, as the wear rings become worn, the efficiency of the pump decreases.

The present invention relates to and is an improvement of the high speed centrifugal pump described previously in U.S. Pat. No. 5,082,428 issued on Jan. 21, 1992 and is also applicable to reverse running pump turbines of similar design. Specifically, the invention is a new and useful improvement in the lubricated thrust bearing/seal originally described in the above patent. The thrust bearing is a hydrostatic bearing positioned adjacent to the suction side of the pump impeller. Both the impeller face and the bearing face are flat and parallel to each other and precisely perpendicular to the axis of rotation. A 360° annular groove is positioned at the working face of the thrust bearing/seal. The inner land provides a seal between the annular groove and the low pressure area of the pump. The outer land of the thrust bearing provides a seal between the annular groove and the high pressure region of the pump.

The annular groove is in communication with the highest pressure region of the pump, the diffuser, by means of a conduit. For operation of original invention see column 4, line 21 through column 6, line 25.

It has been found in practice that the purely hydrostatic thrust bearing/seal works well in cases where the impeller OD to impeller wearing ring OD ratio is sufficiently large to provide a large enough annular groove area along with sufficient land area for effective sealing. This is true of low specific speed impellers (i.e., low flow and high head). However, with higher specific speed impellers (high flow/low head) that have relatively large wearing ring (suction eye) diameters and a relatively small impeller OD, there is only a marginal hydrostatic area available for thrust balancing. Hence, high speed sliding contact could occur in high specific speed impellers often resulting in thrust bearing failure.

Another drawback to the originally described thrust bearing/seal was the provision of supplying pressured fluid from the diffuser section of the pump. In operation, the pressure in the diffuser section is sufficient for hydrostatic thrust bearing operation when the pump was operating in the capacity range of between shutoff (zero flow) and best efficiency point (BEP). At capacity greater than BEP (run out condition) the fluid velocity in the diffuser increases to a point where the static pressure in the conduit falls below the annular groove pressure resulting in reverse flow in the conduit. Such reverse flow means there was insufficient hydrostatic pressure in the annular groove to prevent heavy sliding contact between impeller face and thrust bearing face-end resulting in a destroyed thrust bearing/seal.

Run-out conditions are often present at the startup of a pumping system when the system is being filled. Air is being displaced through throttle devices such as valves or orifices with very little pressure resistance (due to low density of air in comparison to most fluids such as water) thereby causing the centrifugal pump to operate at much greater than BEP capacity. Even if such operation is only for a few seconds, enough rubbing contact can occur in high speed pumps to cause thrust bearing failure. Also careless operation of pumps beyond original design conditions is quite common. The present invention overcomes these problems.

Accordingly, it would be desirable to have an axial thrust bearing for pumps and turbines that balances the axial loads on the impeller and allows the pump or turbine to operate as efficiently as possible.

SUMMARY OF THE INVENTION

The present invention relates to a thrust bearing for a rotating member that is subject to axial forces which forces cause movement in an axial direction of the rotating member. A sealing surface is positioned on at least a portion of the rotating member, and a bearing is positioned adjacent the rotating member. A sealing face is positioned on the bearing. The sealing face is disposed to be in opposed relationship with the sealing surface on the rotating member. A bearing space is located between the sealing face and the sealing surface.

A fluid reservoir is positioned in the bearing and the fluid reservoir is in communication with the bearing space located between the sealing face and the sealing surface. A passageway extends through the bearing to a discharge region adjacent the rotating member to supply a fluid to the fluid reservoir.

A plurality of pockets are positioned on the sealing surface of the rotating member and the pockets are positioned to be in communication with the fluid reservoir. A plurality of wedge shaped depressions are positioned on the sealing surface of the rotating member. The depressions are disposed to be positioned adjacent and in communication with the pockets. The depressions are not in direct communication with the fluid reservoir. Fluid from the reservoir enters the pockets on the sealing surface of the rotating member. As the rotating member rotates, the fluid in the pockets moves in a circular motion which causes the pressure on the fluid in the pockets to increase as the fluid moves radially outwardly. The fluid pressure generated by the pockets acts on the sealing face of the bearing to counteract axial forces acting on the rotating member. Fluid from the pockets also enters the wedge shaped depressions. The pressure on the fluid increases as the fluid is forced due to the rotation of the rotating member into the decreasing clearance formed by the wedge shaped depression. The increased fluid pressure in the depressions also acts on the sealing face of the bearing to counteract axial forces placed on the rotating member.

DETAILED DESCRIPTION OF THE PREFERRED EMBODIMENTS

The invention relates to a thrust bearing and face seal used to axially position a rotating member that is subject to axial forces. More particularly, the thrust bearing utilizes hydrostatic and hydrodynamic forces to balance the axial forces on the rotating member. The thrust bearing utilizes a fluid film between the bearing surface and the rotating member to provide the axial positioning for the rotating member.

The function of the thrust bearing is to limit axial movement of a rotating member that is subjected to forces acting on the rotating member. The forces normally act in a direction that is parallel to the axis of rotation of the rotating member. The thrust bearing must act to limit the axial movement of the rotating member while allowing the rotating member to freely rotate. Thrust bearings are used in a wide array of machinery such as pumps, turbines and motors. The source of the axial thrust on the rotating member can be from the weight of the rotating member as would be the case in a vertically positioned electrical motor. In the case of pumps, turbines and similar devices, the axial thrust is caused by pressure differences in the pumped fluid in the casing of the device. These pressure differentials act on different areas of the rotating member and generate a net axial force along the rotating member's axis of rotation.

Several types of thrust bearings have been developed for use in machinery. One type of thrust bearing uses roller elements such as ball bearings or cylindrical bearings to balance the axial forces on the rotating member. Another type of thrust bearing is a sliding contact bearing. The sliding contact thrust bearing uses a lubricant between the bearing and the rotating member. The lubricant is intended to reduce the sliding friction between the bearing and the rotating member. To handle axial forces, the sliding contact bearing must maintain an unbroken film of lubricant between the bearing and the rotating member. The sliding contact bearing has a low frictional drag and a low rate of wear as long as the bearing surface does not come into contact with the rotating member during the operation of the device. The present invention is an improved sliding contact thrust bearing. The features of the invention will be more readily understood by referring to the attached drawings in combination with the following description.

Figure 1:
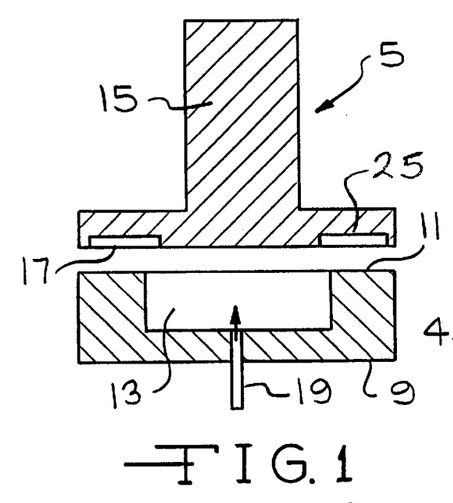
FIG. 1 is a cross-sectional view of the thrust bearing of this invention.
Figure 2:
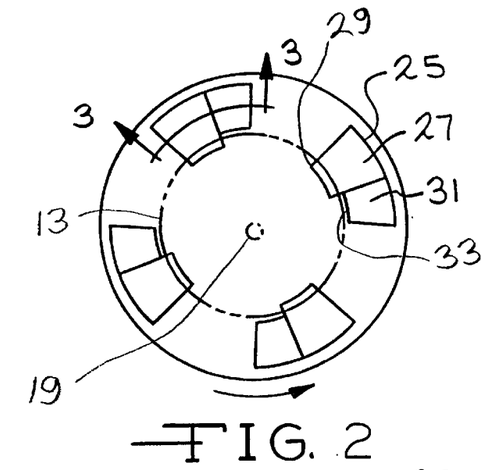
FIG. 2 is a plan view of a portion of the thrust bearing shown in FIG. 1.
Figure 3:
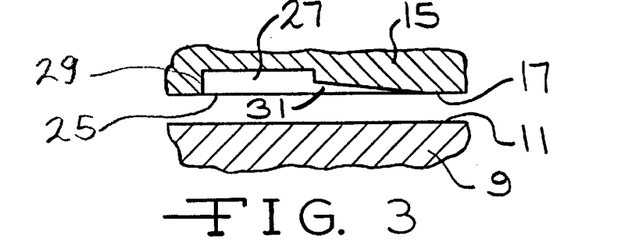
FIG. 3 is a cross-sectional view taken along line 3—3 in FIG. 2.

FIGS. 1, 2 and 3 show one version of the thrust bearing of the present invention. The thrust bearing 5 utilizes a bearing 9 having a sealing face 11 positioned adjacent a rotating member 15 having a sealing surface 17. The bearing 9 and rotating member 15 are disposed so that the sealing face 9 is positioned in spaced apart opposed relationship with the sealing surface 17. A reservoir 13 is positioned in the bearing 9 adjacent to the sealing face 11 on the bearing. A passageway 19 extends through the bearing 9 and into communication with the reservoir 13. The passageway 19 is used to supply a fluid or lubricant to the reservoir 13. As shown in FIGS. 1–3, the bearing 9 is substantially cylindrical in shape and the reservoir 13 is also substantially cylindrical in shape and positioned substantially in the center of the bearing 9. The rotating member 15 is also substantially cylindrical and the sealing surface 17 is substantially cylindrical in shape. The diameter of the sealing surface 17 is substantially the same as the diameter of the sealing face 11 on the bearing 9.

Positioned in the sealing surface 17 of the rotating member 15 is are a plurality of recesses 25. Each recess 25 consists of a pocket 27 and a wedge-shaped chamber 31. The pockets 27 have a uniform depth and extend radially outwardly from the center portion of the sealing surface 17. The pockets can increase in width as they extend radially outwardly on the sealing surface 17. An inner portion 29 of the pocket 27 that is closest to the center of the sealing surface 17 is disposed to be over the fluid reservoir 13. This inner portion 29 of the pocket 27 is positioned so that the inner portion 29 is in free communication with the fluid reservoir 13. The pockets 27 end before they reach the outer periphery of the sealing surface 17 of the rotating member 15.

Positioned adjacent and in communication with each pocket 27 is a wedge-shaped chamber 31. The wedge-shaped chamber 31 extends radially outwardly on the sealing surface 17 of the rotating member 15. The wedge-shaped chambers 31 terminate adjacent the outer periphery of the sealing surface 17 at substantially the same location as the pockets 27. The inner portion 33 of the wedge-shaped chambers 31 terminates at a radial location so that the wedge-shaped chambers 31 do not overlap and are not in communication with the reservoir 13. The wedge-shaped chambers 31 have a depth that varies across the width of the chamber. The deepest portion of the wedge-shaped chambers 31 is located adjacent the pocket 27. As the wedge-shaped chamber 31 moves away from the pocket 27 in a circumferencial direction, the depth of the wedge-shaped chamber 31 decreases. The portion of the wedge-shaped chamber 31 that is circumferencially spaced the furthest from the pocket 27 essentially merges with the sealing surface 17 of the rotating member 15. The wedge-shaped chambers 31 can increase in width as they extend radially outwardly on the sealing surface 17.

Figure 4:
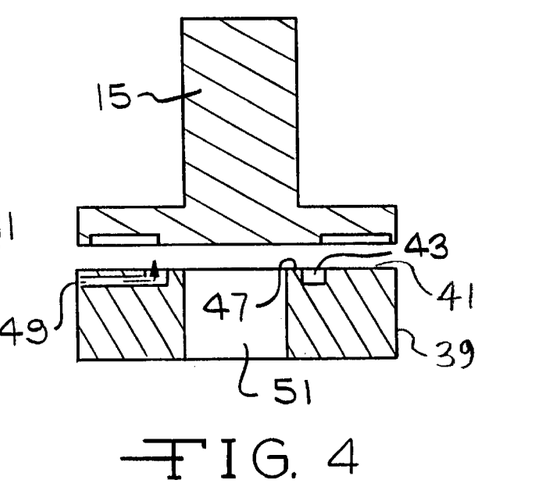
FIG. 4 is a cross-sectional view of another embodiment of the invention.
Figure 5:
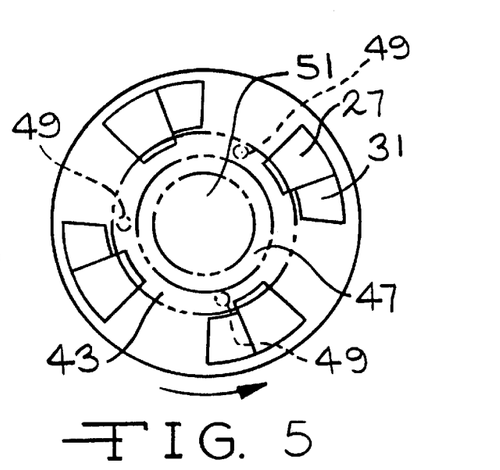
FIG. 5 is a plan view, partially in phantom, of a portion of the embodiment shown in FIG. 4.

FIGS. 4 and 5 show another embodiment of the invention wherein an annular reservoir 43 is positioned on a sealing face 41 on a bearing 39. At least one passageway 49 is disposed for supplying fluid under pressure to the annular reservoir 43. In practice, it has been found that three equally spaced passageways 49 work particularly well in supplying fluid under pressure to the annular reservoir 43. A flow passageway 51 extends through substantially the center of the bearing 39 to provide fluid through the rotating member 15. The rotating member 15 has substantially the same construction as the rotating member previously described with respect to FIGS. 1–3. An inner land 47 separates the annular reservoir 43 from the flow passageway 51. The flow passageway 51 can be, for example, a pump inlet passage or a turbine outlet passage. The pocket 27 of the recess 25 on the rotating member 15 is positioned so that it is in communication with the annular reservoir 43. The wedge-shaped chamber 31 of the recess 25 is positioned so that it is in communication with the pocket 27 but not in communication with the annular reservoir 43. This is essentially the same positioning for the recesses 25 as previously described with regard to rotating member 15.

Figure 6:
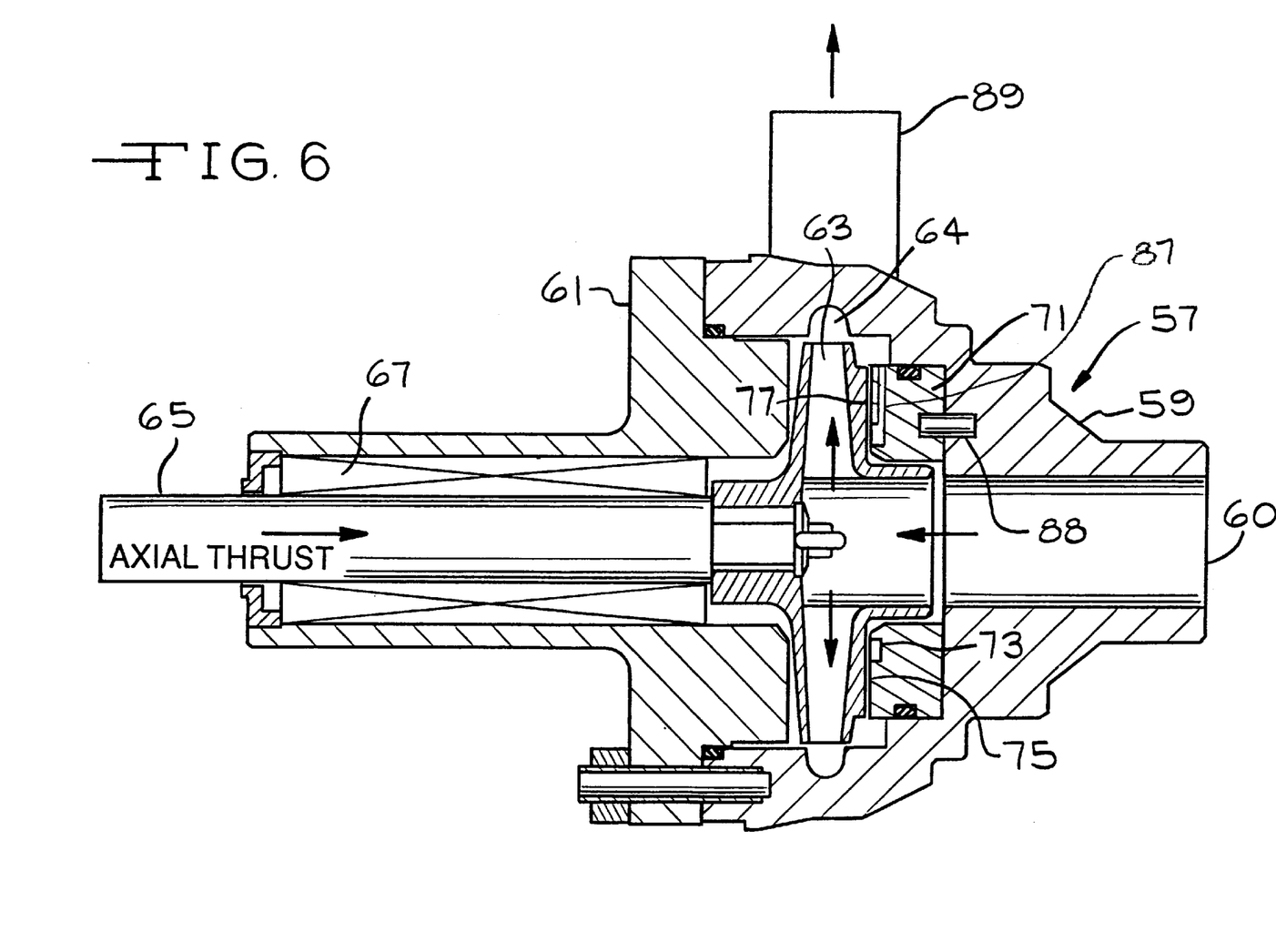
FIG. 6 is a cross-sectional view of another embodiment of the invention.
Figure 7:
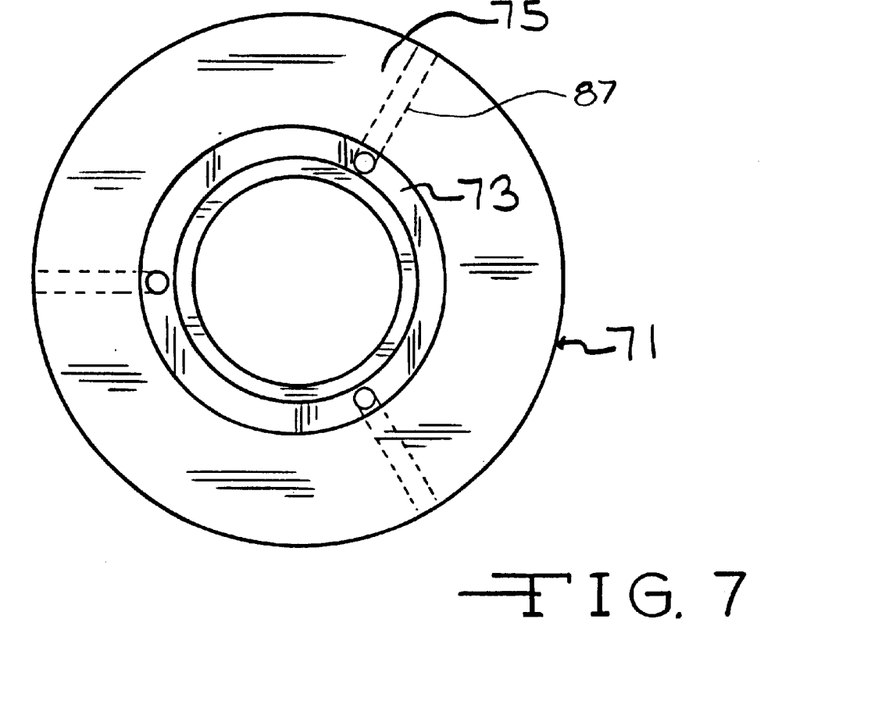
FIG. 7 is a partial plan view of the stationary portion of the thrust bearing of FIG. 6.
Figure 8:
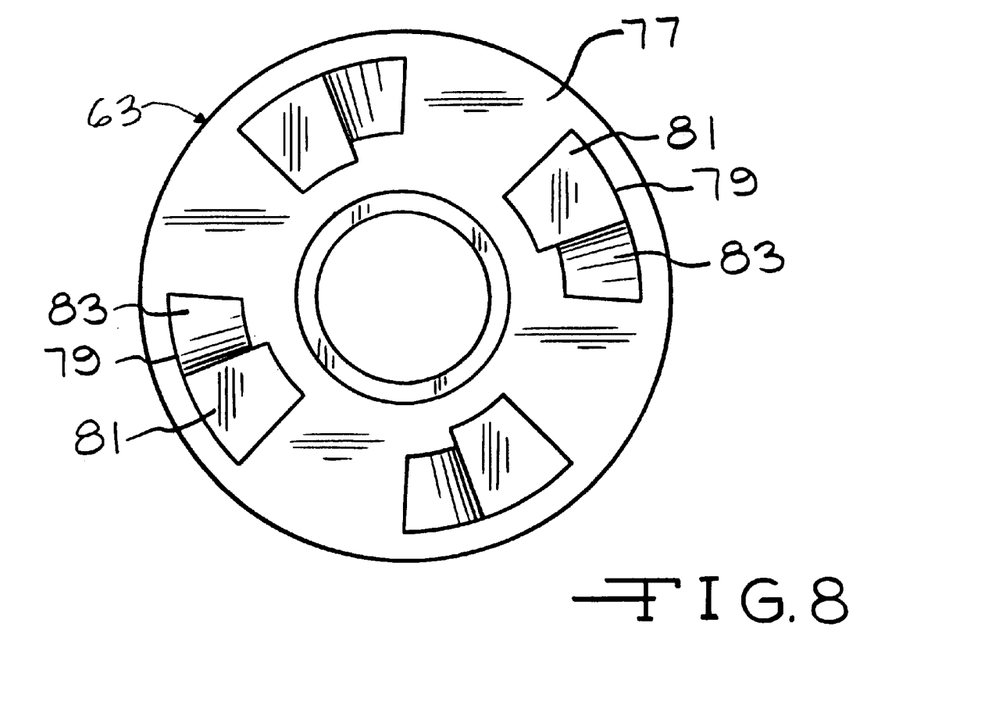
FIG. 8 is a partial plan view of the rotating portion of the thrust bearing of FIG. 6.

FIGS. 6–8 show another embodiment of the thrust bearing of the present invention. In FIG. 6, the thrust bearing is used in a pump or turbine and the axial thrust is generated by different pressures within the casing of the pump or turbine. In this embodiment, pressurized fluid can be drawn from a high pressure region 64 in the casing and used to pressurize the bearing cavity. As the axial thrust imposed upon the rotor of the pump or turbine is generated by the different pressures within the casing, the high pressure that is utilized to pressure the reservoir of the thrust bearing should always be sufficient to counteract the axial forces on the rotor. Explained in a different manner, as the axial thrust on the rotor increases due to increases in pressure in the casing, that same increased pressure would be available for supply to the reservoir of the thrust bearing and this effectively counteracts the axial thrust present in the bearing cavity. In this high pressure region 64 in the pump casing there is always sufficient pressure to supply fluid to an annular groove 73 of the thrust bearing. This is different than the diffuser section of a pump where the pressure can drop due to the increase in fluid velocity at run-out conditions. Thus, using the high pressure region 64 of the pump prevents reverse flow problems and thrust bearing failure.

The centrifugal pump shown in FIG. 6 has a pump casing 59 and a bearing housing 61 that encloses a rotating impeller 63. The rotating impeller 63 is mounted on a shaft 65. The shaft 65 is supported on a bearing 67 that radially positions the shaft but does not resist axial forces. A thrust bearing 71 is located in a counterbore of the pump casing 59. The thrust bearing 71 has an annular reservoir 73 as previously described with regard to FIGS. 4 and 5. The face 77 of the rotating impeller 63 has a plurality of recesses 79 that are formed of pockets 81 and wedge-shaped chambers 83. The recesses 79 and the annular reservoir 73 are shown in more detail in FIGS. 7 and 8. The annular reservoir 73 of the recesses 79 have the same construction and orientation as shown in FIGS. 4 and 5.

The thrust bearing 71 has at least one passageway 87 that extends from the annular reservoir 73, through the thrust bearing 71 to the impeller discharge region 64 in the pump casing 59. The discharge region 64 provides a source of high pressure fluid to the annular reservoir 73. In practice, it has been found advantageous to have three equally spaced passageways 87 positioned in the bearing 71 to supply fluid under pressure to the annular reservoir 73. A pin 88 can be disposed to extend from the thrust bearing 71 into the pump casing 59 to prevent the thrust bearing from rotating in the pump casing as the impeller 63 is rotated.

Figure 9:
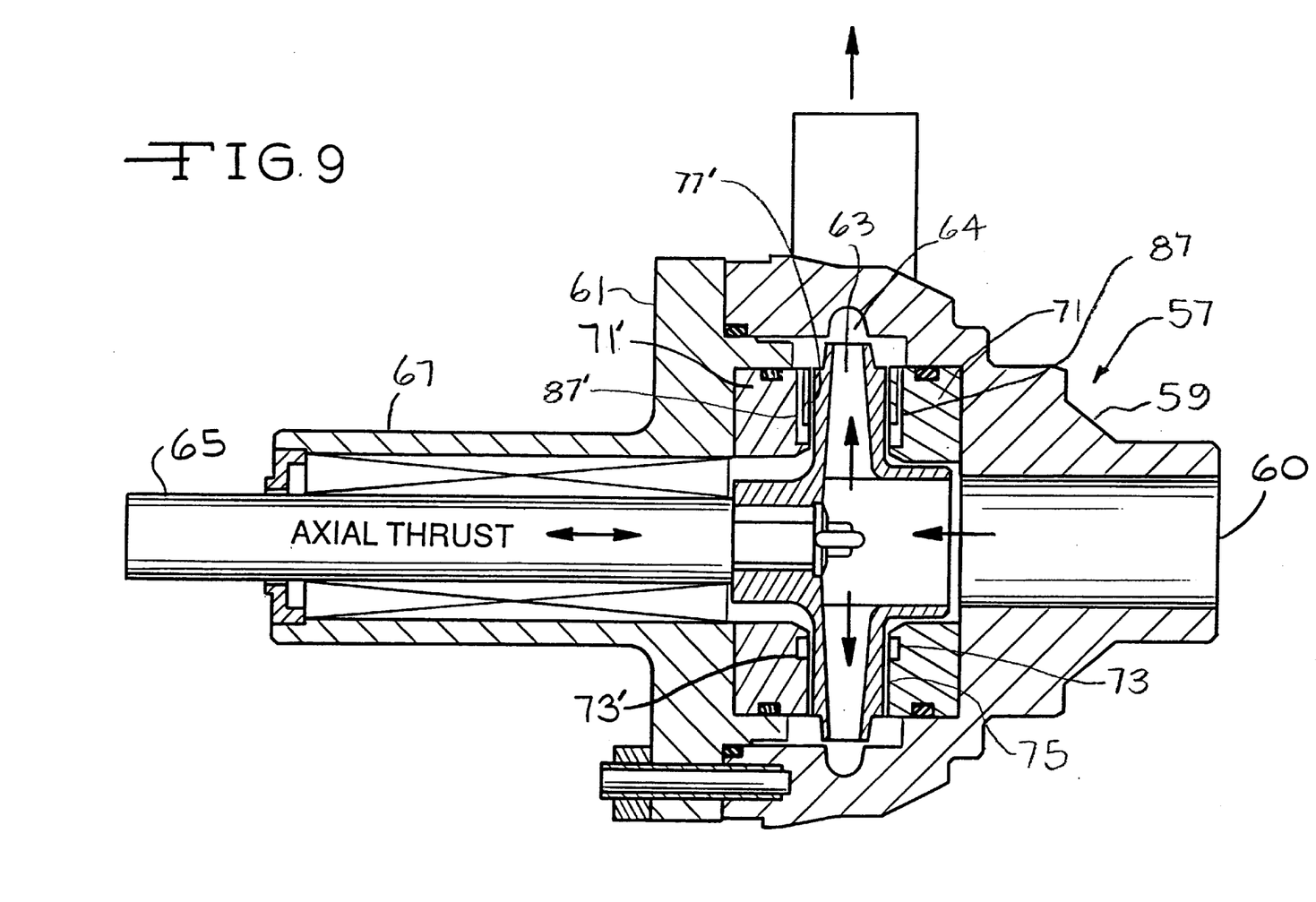
FIG. 9 is a cross-sectional view of another embodiment of the invention.
Figure 10:
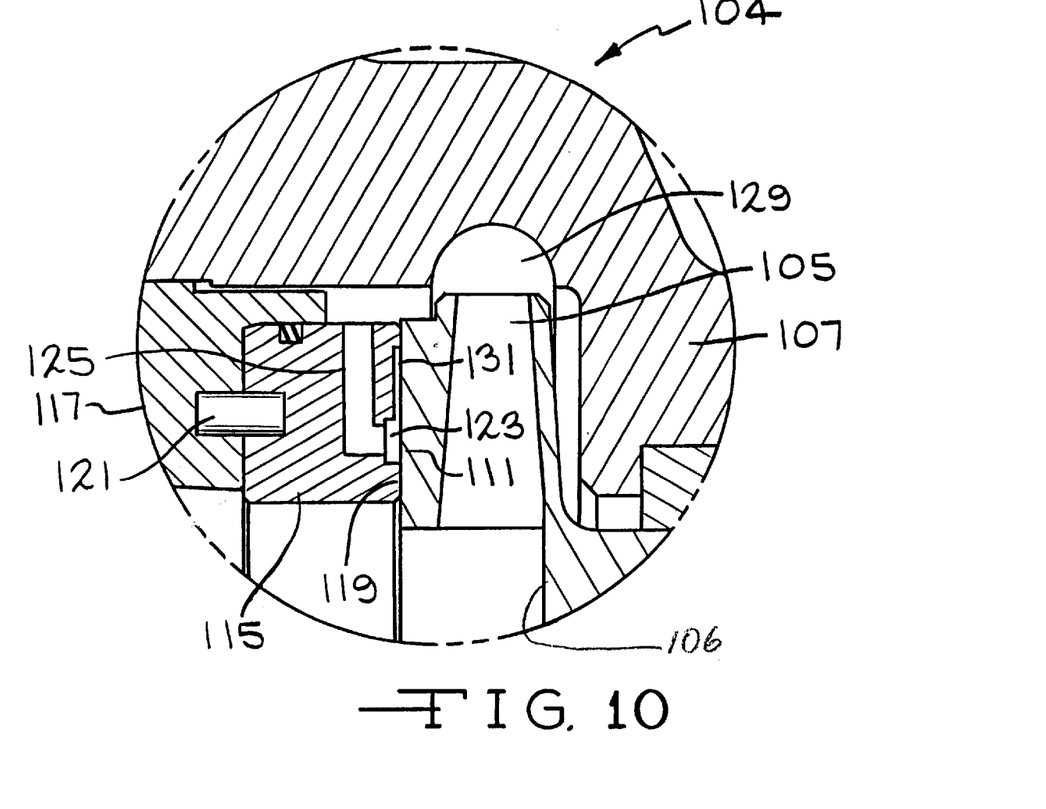
FIG. 10 is a cross-sectional view of a thrust bearing of another embodiment of the invention.
Figure 11:
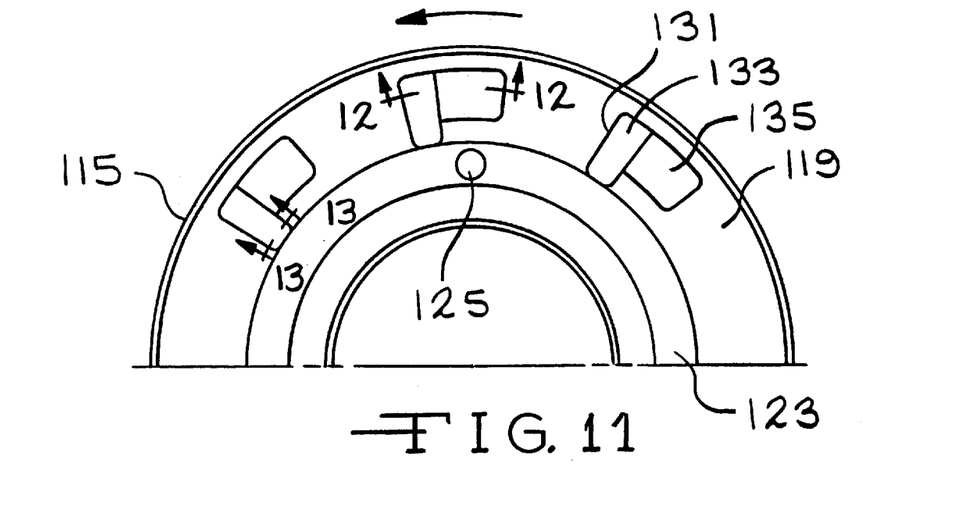
FIG. 11 is a partial plan view of a portion of the embodiment shown in FIG. 10.
Figure 12:
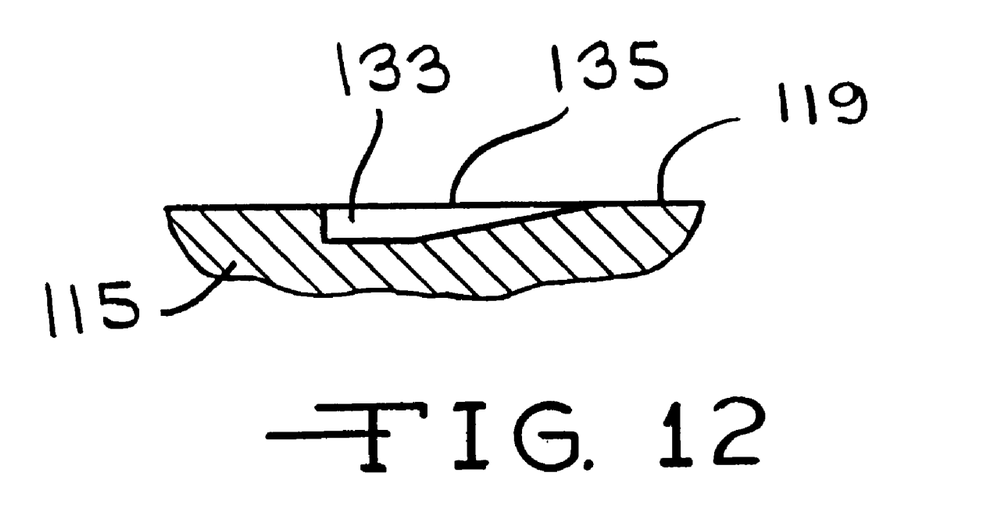
FIG. 12 is a cross-sectional view taken along the line 12—12 in FIG. 11.
Figure 13:
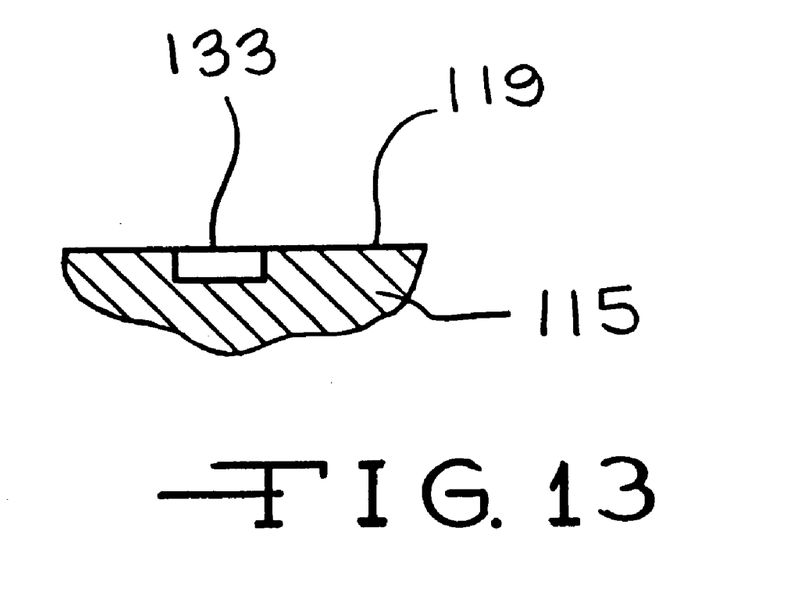
FIG. 13 is a cross-sectional view taken along the line 13—13 in FIG. 11.

Another embodiment of the invention is shown in FIG. 9. This embodiment is very similar to the centrifugal pump shown in FIGS. 6–8 with the exception that a second thrust bearing 71' is positioned in the bearing housing 61 adjacent to the rotating impeller 63. The thrust bearing 71' has an annular reservoir 73'. It is substantially the same as the thrust bearing as described with regard to FIGS. 6–8. A plurality of recesses, the same as the recesses 79 shown in FIG. 8, are positioned on a second face 77' of the impeller 63 that faces the second thrust bearing 71'. The recesses are as previously described with regard to FIG. 7. The embodiment shown in FIG. 9 allows the centrifugal pump to counteract axial thrust that are directed in both directions along the axis of the shaft 65.

The operation of the invention will be best understood by referring to FIGS. 6–8 that show the use of the thrust bearing concept with a centrifugal pump. In this embodiment, a liquid is drawn into the pump inlet 60 by the rotation of the impeller 63. The rotating impeller causes the fluid to move outwardly in the pump casing 59 to the discharge passageway 89. As the fluid is forced radially outwardly by the rotation of the impeller 63, the pressure of the liquid is increased. As the impeller 63 rotates, the total pressure forces on the back shroud of the impeller 63 are of a greater magnitude than the pressure force on the front shroud face 77. This pressure imbalance causes the impeller 63 to move in a direction toward the pump inlet 60. This motion of the rotating impeller 63 creates an axial thrust along the axis of shaft 65 upon which the impeller 63 is mounted. The bearing 67 in the bearing housing 61 supports the shaft 65 but does not prevent axial movement of the shaft 65 in a direction that is parallel to the axis of the shaft. It is important that the rotating impeller 63 not strike the thrust bearing 71 as it moves in a direction toward the pump inlet 60.

To counteract the axial thrust on the rotating impeller 63, fluid from the impeller discharge region 64 of the centrifugal pump 57 is supplied through 3 equally spaced passageways 87 in the thrust bearing 71 to the annular reservoir 73 located in the thrust bearing 71. The pressure of the fluid that is positioned in the annular reservoir 73 acts against the rotating impeller 63 and assists in maintaining the impeller in a spaced apart relationship from the thrust bearing 71. In addition, the fluid that is supplied to the annular reservoir 73 is also in communication with the pockets 81 of the recesses 79 located on the face 77 of the impeller 63. Thus, some of the fluid under pressure in the annular reservoir 73 moves into the pockets 81 and also into the wedge-shaped chambers 83 that are connected to the pockets 81. The rotation of the impeller 63 causes the liquid that is in the pockets 81 to move in a circular or circumferential motion. The rotation of the impeller 63 also causes the liquid in the pockets 81 to move radially outwardly in the pockets as the impeller rotates. The radially outwardly motion of the fluid causes the pressure to rise through centrifugal force in each pocket 81. The pressure in the pockets 81 continually increases as the fluid moves further radially outwardly in the pockets 81. The fluid that is in the wedge-shaped chambers 83 that are in communication with the pockets 81 also experiences the same centrifugal force and an increase in pressure as the liquid in the wedge-shaped chambers 83 moves radially outwardly. The fluid pressure that is generated in the pockets 81 and wedge-shaped chambers 83, due to the rotation of the impeller 63, generates a fluid pressure that is greater than the fluid pressure present in the annular reservoir 73. This fluid pressure is exerted between the rotating impeller 63 and the face 75 of the thrust bearing 71. This fluid pressure in the pockets 81 and wedge-shaped chambers 83 counteracts the axial forces acting on the impeller 63 that moves the impeller 63 in a direction towards the pump inlet 60.

The wedge-shaped chambers 83 also act to generate an additional pressure gradient to balance the axial thrust on the rotating impeller 63. The rotation of the impeller 63 drags fluid in the direction of rotation. As the wedge-shaped chambers 83 decrease in depth as they move away from the pockets 81, there is a decreasing clearance between the wedge-shaped chambers 83 and the face 75 of the thrust bearing 71. Accordingly, the pressure in the wedge-shaped chambers 83 increases as the fluid moves circumferencially from the portion of the wedge-shaped chamber 83 that is located adjacent to the pockets 81 to the end of the wedge-shaped chamber 83 that is spaced apart from the pockets 81. It should be noted that the wedge-shaped chambers 83 are positioned so that the rotation of the impeller 63 drags the fluid in the wedge-shaped chambers in this direction. The decrease in clearance between the wedge-shaped chambers 83 and the face 75 of the thrust bearing 71 generates an increase in pressure that acts against the impeller 63 to offset the axial thrust acting on the impeller.

Since the liquid under pressure is supplied to the annular reservoir 73, this liquid can escape between the face 75 of the thrust bearing 71 and the face 77 of the impeller 63. If there is a large spacing between the face 77 of the impeller 63 and the face 75 of the thrust bearing 71, the liquid in the annular reservoir 73 will move out into the discharge and suction region of the pump casing 59. However, as the face 77 of the impeller 63 moves toward the face 75 of the thrust bearing 71 there is less opportunity for the liquid to flow between the thrust bearing 71 and the impeller 63 into the discharge and suction region of the pump casing 59. In fact, as the impeller 63 gets closer to the thrust bearing 71 more fluid will be retained in the annular reservoir 73 and the hydrostatic pressure in the reservoir 73 will increase. More liquid will also be retained in the pockets 81 and wedge-shaped chambers 83 and the pressure generated by the centrifugal force of the rotating impeller 63 will cause an increase in the pressure in the recesses 79 as the liquid moves radially outwardly in the recesses. In addition, the space between the wedge-shaped chambers 83 and the face 75 of the thrust bearing 71 will be reduced and this will increase the pressure in the wedge-shaped chambers 83 due to the hydrodynamic effect created by the wedge-shaped configuration of these chambers. This establishes that the thrust bearing of the present invention utilizes three methods to resist the axial force present on the rotating impeller 63, that is, the pressure generated in the recesses 79 by the centrifugal force supplied by the rotating impeller, the pressure created by the hydrodynamic effect of the wedge-shaped chambers, and the hydrostatic pressure present in the annular reservoir 73. All three pressures act upon the impeller 63 to keep the impeller 63 spaced apart from the face 75 of the thrust bearing 71. Since the pressure that acts upon the impeller 63 varies with the clearance between the impeller 63 and the thrust bearing 71, the thrust bearing 71 can accommodate changes in operating conditions for the centrifugal pump. If the pump rotates faster and there is a larger axial thrust applied to the impeller 63, the space between the impeller 63 and the thrust bearing 71 decreases which results in an increase in the effective pressure provided by the fluid that is supplied to the annular reservoir 73. The pressure that is provided by the fluid supplied to the annular reservoir 73 will continue to increase until the pressure acting on the impeller 63 balances the axial thrust experienced by the impeller 63. As the impeller 63 moves away from the thrust bearing 71, the effect of the pressure of the liquid supplied to the annular reservoir 73 will decrease and the impeller 63 will be allowed to move toward the thrust bearing 71 until the axial thrust forces on the impeller 63 are balanced out.

Since the pressurized fluid is drawn from the impeller discharge region 64 of the centrifugal pump 57, there should always be sufficient pressure available in the liquid that is supplied to the annular reservoir 73 to counteract axial thrust forces that are imparted to the rotating impeller 63. Since the axial thrust on the impeller 63 is generated by differential pressures within the pump casing 59 of the centrifugal pump 57, the high pressure liquid in the impeller discharge region 89 should always have sufficient pressure to counteract the axial thrust forces that are generated by the pressure differentials.

It has been found that sufficient pressure exists at the impeller discharge thrust bearing outer diameter for all capacities from zero flow to run out to reliably operate the thrust bearing of this invention. It should be noted that the combination of hydrostatic and hydrodynamic operation offers advantages that cannot be achieved when either method is used individually. For instance, the hydrostatic feature prevents contact between the thrust bearing and impeller during the time where the impeller speed is ramping up to an RPM where the hydrodynamic pressure become effective. Starting and stopping of a pump is usually the time of greatest wear on bearing. The hydrostatic feature minimized this wear.

As mentioned previously, pump impellers that have a ratio between the impeller outside diameter and wear ring diameter of less than 1.5 cannot incorporate sufficient hydrostatic annular groove area to effectively counterbalance opposing thrust loads of the impeller. With the present invention, the hydrodynamic feature provides the additional counterbalancing pressure necessary for reliable operation.

FIG. 9 shows an embodiment where a thrust bearing 71 is positioned on each side of the rotating impeller 63. This embodiment functions in exactly the same manner as the embodiment described in FIGS. 6–8. The only difference is that there is a self-regulating thrust bearing located on each side of the rotating impeller 63 and this allows the thrust bearings 73 to counteract axial thrust forces that are imparted to the impeller in a direction toward the pump inlet 60 or away from the pump inlet 60.

FIGS. 10–13 show another embodiment of a thrust bearing. This embodiment is similar to the embodiments previously disclosed but this embodiment works particularly well with a hydraulic turbocharger as shown in U.S. Pat. Nos. 4,966,708; 4,983,305 and 5,049,045. These patents for a hydraulic turbocharger are hereby incorporated by reference. Hydraulic turbochargers are usually positioned downstream of a feed pump and there is a large axial thrust imposed on the rotor of the turbocharger before there is sufficient hydraulic energy available in the turbine section to rotate the turbine impeller. A hydrostatic thrust bearing that is pressurized from either the pump section of the turbocharger on the inlet pipe to the turbine nozzle could accommodate the axial thrust and allow the turbine rotor to rotate. However, there are several significant drawbacks to such a hydrostatic thrust bearing. The external pressurization line and fittings that are required are usually made of stainless steel and costly to produce. Any failure of the external pressurization line results in an interruption of pressurized fluid to the thrust bearing and a failure of the thrust bearing to accommodate axial thrust loads. Obviously, a failure of the thrust bearing to work properly results in a failure of the turbocharger. For a hydraulic turbocharger a purely hydrodynamic thrust bearing will not work because the axial force on the turbine impeller is of such a magnitude that the rotor cannot develop sufficient breakout torque to start rotation.

A distinct improvement in hydraulic turbocharger thrust bearings can be made by combining hydrostatic and hydrodynamic features into a thrust bearing. However, the hydrodynamic features of the thrust bearing must be tailored to not create a pumping action that decreases the efficiency of the hydraulic turbocharger.

The thrust bearing shown in FIGS. 10–13 is similar to the previously described thrust bearings. A thrust bearing 115 is positioned adjacent the turbine impeller 105 in the turbine casing 107. The turbine impeller 105 has a sealing surface 111. The bearing 115 is positioned in the bearing housing 117 adjacent to the turbine impeller 105. The bearing 115 has a sealing face 119 that is positioned in spaced apart opposed relationship to the sealing surface 111 on the turbine impeller 105. A pin 121 extends from the bearing housing 117 in to the bearing 115 to prevent the bearing from rotating.

An annular groove or fluid reservoir 123 is positioned in the sealing face 119 of the bearing 115. At least one passageway 125 connects the annular groove 123 to a region or volute 129 that is positioned in the turbine casing 107 adjacent to the outer periphery of the turbine impeller 105.

A plurality of recesses 131 are positioned in the sealing face 119 of the bearing 115. Each recess 131 has a pocket 133 and a wedge shaped chamber 135. The recesses, pockets and wedge shaped chambers are generally constructed as previously described. However, the pockets and wedge shaped chambers are positioned in the sealing face of the bearing 115 instead of the rotating member or impeller as previously described. Also, the pockets 133 are in direct communication with the annular groove 123 positioned in the sealing face 119 of the bearing 115.

In operation, pressurized fluid is introduced into the volute 129 in the turbine casing 107. This fluid under pressure acts upon the turbine impeller 105 and causes the impeller 105 to rotate. The fluid also enters the passageway 125 and is accordingly supplied to the annular groove 123, the pockets 133 and the wedge shaped chambers 135 in the bearing 115. The hydrostatic area, that is the area of the annular groove 123 and the recesses 131, provides enough fluid pressure on the turbine impeller 105 to overcome breakout torque and to allow the turbine impeller to rotate. As the turbine impeller 105 rotates, the fluid supplied to the recesses 131 is dragged in the direction of rotation. The fluid pressure increases as the fluid is squeezed by the decreasing clearance in the wedge shaped chambers 135. This provides a hydrodynamic pressure balancing force to the counterbalance axial thrust loads on the turbine impeller 105. The fluid pressure increases in the wedge shaped chambers 135 due to increasing rotational speed of the turbine impeller, decreasing clearance between the sealing surface 111 of the turbine impeller and the sealing face 119 on the bearing 115 and with increasing viscosity of the fluid supplied to the volute 129.

The fluid introduced into the volute 129 to cause the turbine impeller 105 to rotate is discharged from the turbine 104 at the center 106 or eye region of the turbine impeller 105. By placing the recesses 131 on the sealing face 119 of the bearing 115 a hydrodynamic pressure is generated to counteract axial forces of the impeller turbine 105. However, since the recesses 131 are not rotating, there is no pumping action that causes the fluid to move in a radially outwardly direction. The elimination of the pumping action increases the efficiency of the turbine 104. If fluid is pumped radially outwardly by the pumping action of rotating recesses located on the turbine impeller 105, this fluid pressure is throttled down to the pressure level existing in the volute 129 and is therefore lost to do useful work and results in decreased efficiency. By placing the recesses 131 on the non-rotating sealing face 119 of the bearing 115 a hydrodynamic axial thrust balancing force can be generated for the thrust bearing 103 without significantly reducing the efficiency of the turbine 104.

It is to be understood that a further thrust bearing can be positioned on each side of the rotating impeller 105. This embodiment functions in exactly the same manner as the embodiment described in FIG. 9 in that there is a self-regulating thrust bearing located on each side of the rotating impeller which allows the thrust bearings to counteract axial thrust forces that are imparted to the impeller in a direction toward the volute 129 or away from the volute 129.

The above detailed description of the present invention is given for explanatory purposes. It will be apparent to those skilled in the art that numerous changes and modifications can be made without departing from the scope of the invention. Accordingly, the whole of the foregoing description is to be construed in an illustrative and not a limitative sense, the scope of the invention being defined solely by the appended claims.

I claim:

1. A hydrodynamic and hydrostatic thrust bearing comprising:

a rotating member that is subject to axial forces causing movement in an axial direction of said rotating member;

a sealing surface positioned on at least a portion of said rotating member;

a bearing positioned adjacent said rotating member;

a sealing face positioned on said bearing, said sealing face being disposed to be in opposed relationship with said sealing surface on said rotating member, a bearing space being located between said sealing face and said sealing surface;

a fluid reservoir positioned in said bearing, said fluid reservoir being in communication with said bearing space located between said sealing face and said sealing surface;

at least one passageway extending through said bearing to a volute region adjacent said rotating member for supplying a supply of high pressure fluid under hydrodynamic and hydrostatic pressure to said fluid reservoir, said fluid under said hydrodynamic and hydrostatic pressure in said fluid reservoir acting on said sealing face of said bearing to counteract axial forces placed on said rotating member;

a plurality of pockets positioned on said sealing face of said bearing, said pockets being positioned to be in communication with said fluid reservoir; and a plurality of wedge shaped depressions positioned on said sealing face of said bearing, said depressions being disposed to be positioned adjacent and in communication with said pockets, said depressions each having an inner portion which terminates at a radial location so that the wedge shape depressions do not overlap and are not in communication with said fluid reservoir such that fluid does not flow through said wedge shaped depressions into said fluid reservoir, whereby fluid from said reservoir enters said pockets on said sealing face of said bearing; and whereby, as said rotating member rotates, the fluid in said pockets is dragged by said rotating member into said wedge shaped depressions, the hydrodynamic pressure on said fluid increasing as said fluid is forced, due to the rotation of said rotating member, into a decreasing clearance formed by said wedge shaped depressions, said increased fluid hydrodynamic pressure in said depressions acts on said sealing face of said bearing to counteract axial forces placed on said rotating member; and, whereby the thrust bearing acts as a high pressure sealing mechanism by restricting pressure loss between said volute region adjacent said rotating member and a center region of said rotating member, said bearing space between said sealing surface of said rotating member and said sealing face of said bearing being determined by the dynamics of said hydrodynamic and said hydrostatic pressures thereby increasing the efficiency of said thrust bearing.

2. The thrust bearing of claim 1 wherein said wedge shaped depressions decrease in depth as said wedge shaped depressions extend circumferencially away from said pocket.

3. The thrust bearing of claim 2 wherein said rotating member is designed to rotate in a direction that causes fluid in said pockets to flow into said wedge shaped depressions.

4. The thrust bearing of claim 3, wherein said fluid reservoir comprises a passageway in communication an annular groove positioned in said sealing face of said bearing.

5. The thrust bearing of claim 1 wherein said rotating member is subjected to axial forces in opposing directions that cause axial movement of said rotating member; said rotating member having a second sealing surface on an opposed side of said rotating member, a second bearing being positioned adjacent said opposed side of said rotating member to resist said axial forces.

6. The thrust bearing of claim 5, wherein said second bearing has a sealing face and at least one passageway extending through said bearing to said volute region adjacent said rotating member for supplying said fluid under hydrodynamic and hydrostatic pressure to said fluid reservoir, said fluid under said hydrodynamic and hydrostatic pressure in said fluid reservoir acting on said sealing face of said second bearing to counteract axial forces placed on said rotating member;

a plurality of pockets positioned on said sealing face of said second bearing, said pockets being positioned to be in communication with said fluid reservoir; and a plurality of wedge shaped depressions positioned on said sealing face of said second bearing, said depressions being disposed to be positioned adjacent and in communication with said pockets, said depressions each having an inner portion which terminates at a radial location so that the wedge shape depressions do not overlap and are not in communication with said fluid reservoir, whereby fluid does not flow through said wedge shaped depressions into said fluid reservoir.

7. A thrust bearing comprising:

a rotating member that is subject to axial forces causing movement in an axial direction of said rotating member;

a sealing surface positioned on at least a portion of said rotating member;

a bearing positioned adjacent said rotating member;

a sealing face positioned on said bearing, said sealing face being disposed to be in opposed relationship with said sealing surface on said rotating member, a bearing space being located between said sealing face and said sealing surface;

a fluid reservoir positioned in said bearing, said fluid reservoir being in communication with said bearing space located between said sealing face and said sealing surface;

at least one passageway extending through said bearing to a volute region adjacent said rotating member for supplying a fluid under pressure to said fluid reservoir, said fluid under pressure in said fluid reservoir acting on said sealing face of said bearing to counteract axial forces placed on said rotating member;

a plurality of pockets positioned on said sealing face of said bearing, said pockets being positioned to be in communication with said fluid reservoir; and a plurality of wedge shaped depressions positioned on said sealing face of said bearing, said depressions being disposed to be positioned adjacent and in communication with said pockets, said depressions not being in communication with said fluid reservoir, fluid from said reservoir enters said pockets on said sealing face of said bearing, as said rotating member rotates the fluid in said pockets is dragged by said rotating member into said wedge shaped depressions, the pressure on said fluid increases as said fluid is forced, due to the rotation of said rotating member, into a decreasing clearance formed by said wedge shaped depressions, said increased fluid pressure in said depressions acts on said sealing face of said bearing to counteract axial forces placed on said rotating member, wherein said rotating member is an impeller located in a hydraulic turbocharger, said turbocharger defining said volute region which receives fluid under pressure, said passageway being in communication with said volute region of said turbocharger.

8. The thrust bearing of claim 7, wherein said wedge shaped depressions decrease in depth as said wedge shaped depressions extend circumferentially away from said pocket.

9. The thrust bearing of claim 8, wherein said rotating member is designed to rotate in a direction that causes fluid in said pockets to flow into said wedge shaped depressions.

10. The thrust bearing of claim 9, wherein said fluid reservoir is an annular groove positioned in said sealing face of said bearing.

11. The thrust bearing of claim 7, wherein said rotating member is subjected to axial forces in opposing directions that cause axial movement of said rotating member; said rotating member having a second sealing surface on an opposed side of said rotating member, a second bearing being positioned adjacent said opposed side of said rotating member to resist said axial forces.

12. The thrust bearing of claim 11, wherein said second bearing has a sealing face and at least one passageway extending through said bearing to said volute region adjacent said rotating member for supplying said fluid under hydrodynamic and hydrostatic pressure to said fluid reservoir, said fluid under said hydrodynamic and hydrostatic pressure in said fluid reservoir acting on said sealing face of said second bearing to counteract axial forces placed on said rotating member;

a plurality of pockets positioned on said sealing face of said second bearing, said pockets being positioned to be in communication with said fluid reservoir; and a plurality of wedge shaped depressions positioned on said sealing face of said second bearing, said depressions being disposed to be positioned adjacent and in communication with said pockets, said depressions each having an inner portion which terminates at a radial location so that the wedge shape depressions do not overlap and are not in communication with said fluid reservoir, whereby fluid does not flow through said wedge shaped depressions into said fluid reservoir.

* * * * *